Figure 1:
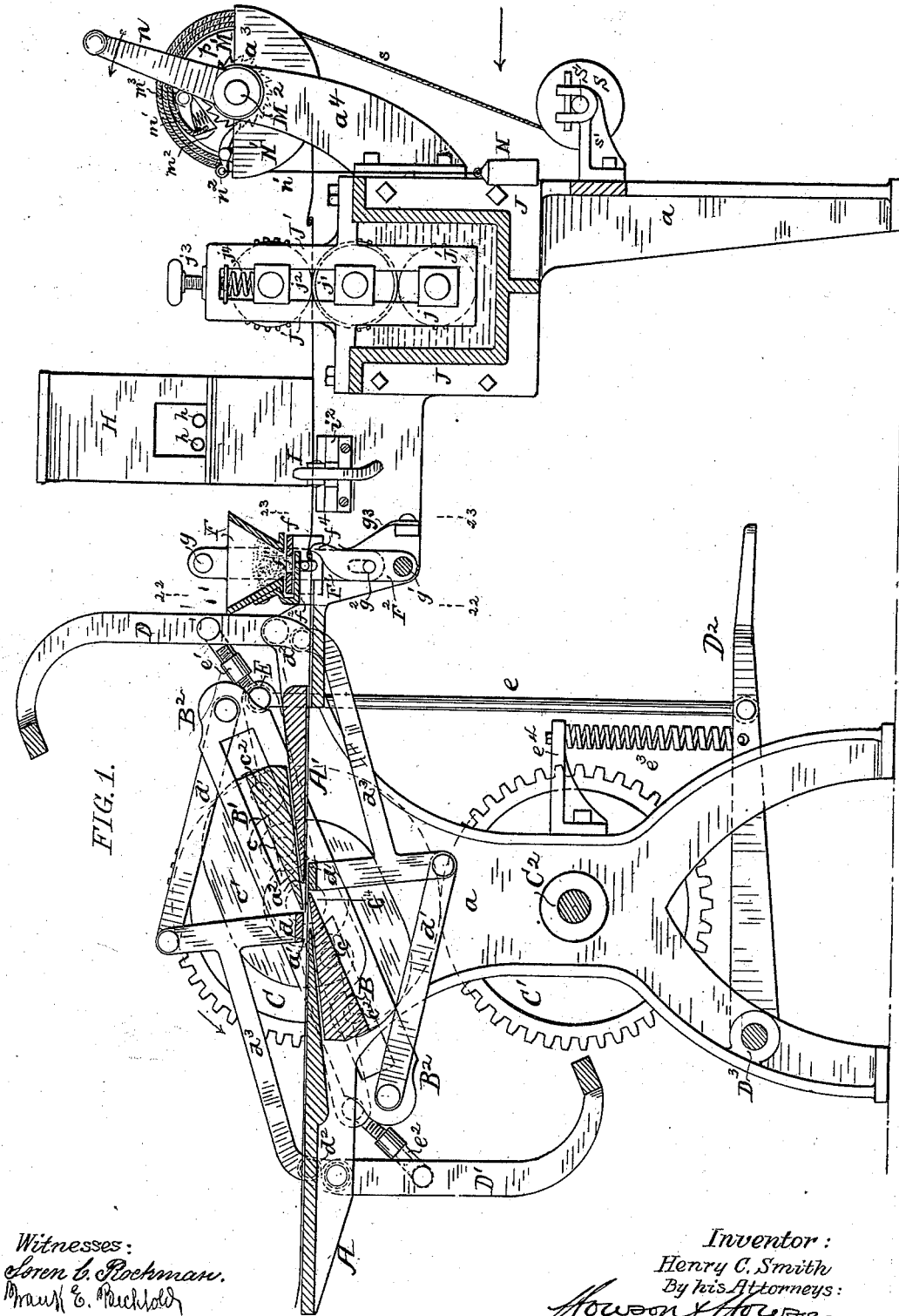

(No Model.) 6 Sheets—Sheet 1.

H. C. SMITH.
MACHINE FOR PREPARING ROOFING TIN.

No. 550,572. Patented Nov. 26, 1895.

Witnesses:
Loren C. Rockman.
Frank E. Bechtold.

Inventor:
Henry C. Smith
By his Attorneys:
Howson & Howson (No Model.) 6 Sheets—Sheet 2.

H. C. SMITH.
MACHINE FOR PREPARING ROOFING TIN.

No. 550,572. Patented Nov. 26, 1895.

Witnesses:
Soren E. Rockman.
Frank E. Bechtold.

Inventor
Henry C Smith
By his Attorneys:
Howson & Howson (No Model.)  6 Sheets—Sheet 3.

H. C. SMITH.
MACHINE FOR PREPARING ROOFING TIN.

No. 550,572.  Patented Nov. 26, 1895.

Witnesses:

Inventor
Henry C. Smith
By his Attorneys
Howson & Howson (No Model.) 6 Sheets—Sheet 4.
H. C. SMITH.
MACHINE FOR PREPARING ROOFING TIN.
No. 550,572. Patented Nov. 26, 1895.
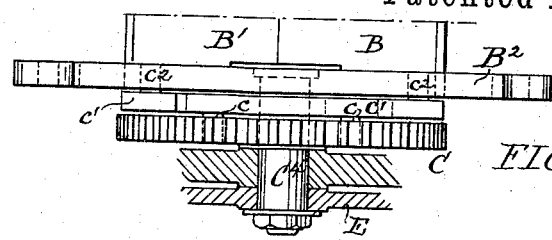
FIG. 4.
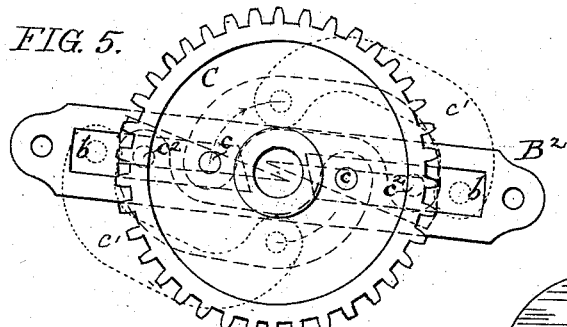
FIG. 5.
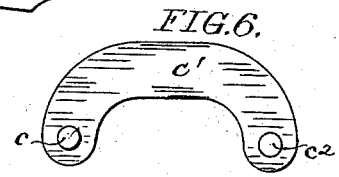
FIG. 6.
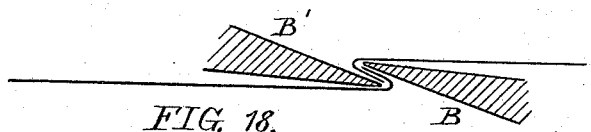
FIG. 18. 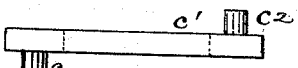 FIG. 7.
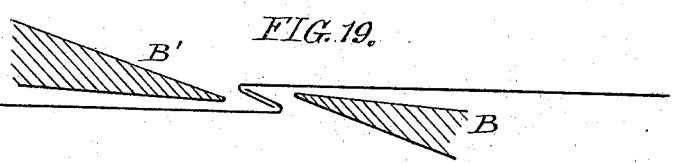
FIG. 19.
FIG. 21.
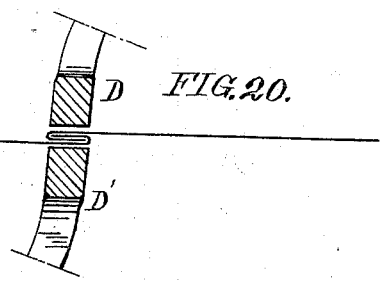
FIG. 20.
Witnesses:
Soren E. Rockman.
Frank E. Reinhold
Inventor:
Henry C. Smith
By his Attorneys
Howson & Howson (No Model.) 6 Sheets—Sheet 5.
H. C. SMITH.
MACHINE FOR PREPARING ROOFING TIN.
No. 550,572. Patented Nov. 26, 1895.
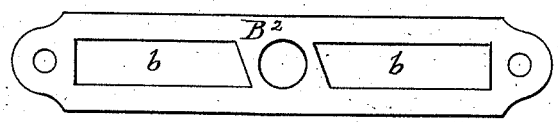
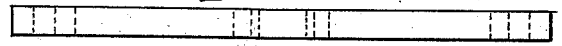
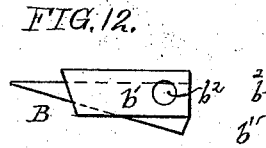
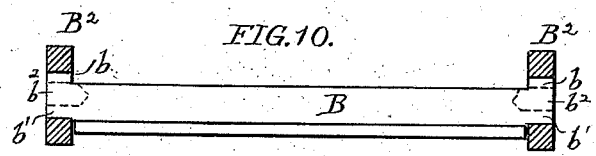
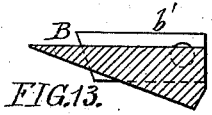
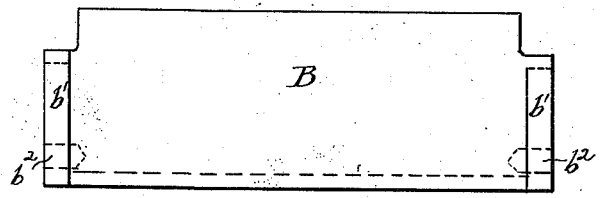
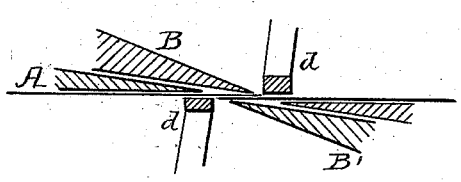
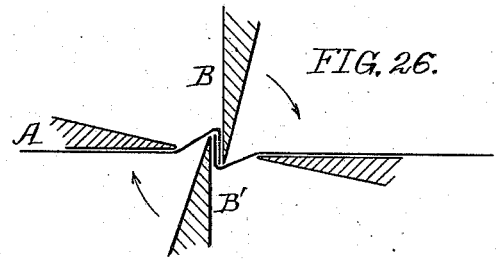
Witnesses
Frank E. Buchhold
Loren C. Rockman
Inventor:
Henry C. Smith
By his Attorneys:
Howson & Howson (No Model.) 6 Sheets—Sheet 6.
H. C. SMITH.
MACHINE FOR PREPARING ROOFING TIN.
No. 550,572. Patented Nov. 26, 1895.
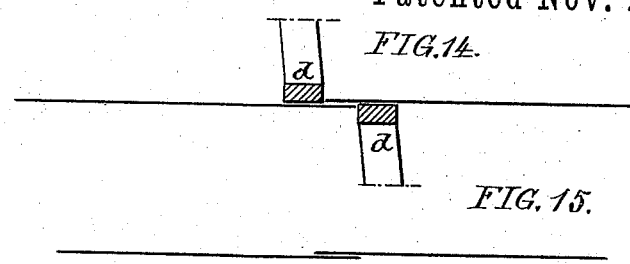
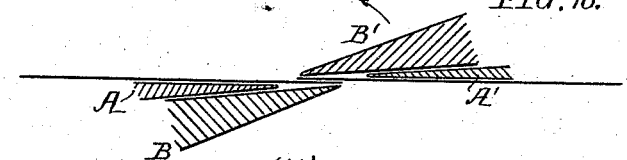
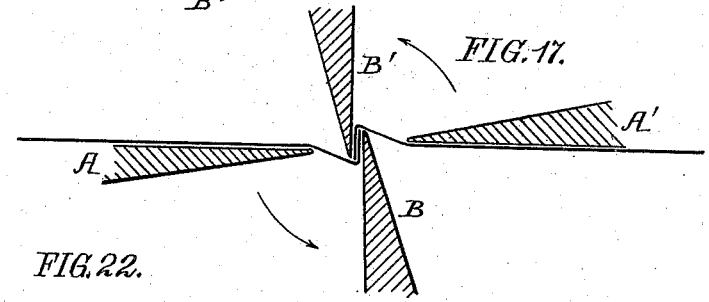
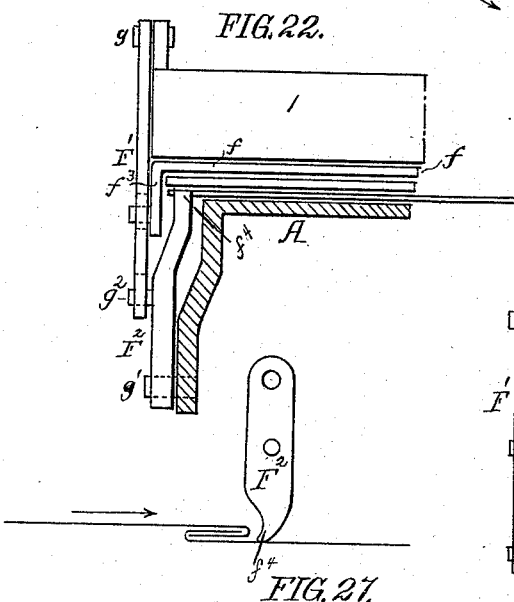
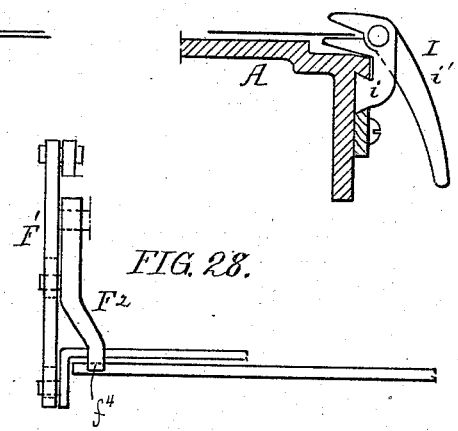
Witnesses:
Soren C. Rackman
Frank E. Bechtold
Inventor:
Henry C. Smith
By his Attorneys
Howson & Howson

UNITED STATES PATENT OFFICE.

HENRY C. SMITH, OF ROANOKE, VIRGINIA, ASSIGNOR OF ONE-HALF TO JOSEPH R. COLLINGWOOD, OF SAME PLACE, AND HARRY C. GARA, OF PHILADELPHIA, PENNSYLVANIA.

MACHINE FOR PREPARING ROOFING-TIN.

SPECIFICATION forming part of Letters Patent No. 550,572, dated November 26, 1895.

Application filed August 11, 1894. Serial No. 520,035. (No model.)

*To all whom it may concern:*

Be it known that I, HENRY C. SMITH, a citizen of the United States, and a resident of Roanoke, Virginia, have invented certain Improvements in Machines for Preparing Roofing-Tin, of which the following is a specification.

The object of my invention is to construct a machine for preparing terne plates complete for roofing purposes in one general operation or in one passage of the plates through the machine.

It consists, first, in gaging-bars for determining and gaging the width of the lap of the edges of one plate over the other for making the seam; second, mechanism for simultaneously bending said edges so as to interlock each other; third, mechanism for effectively closing the interlocked edges, so as to form a permanent seam; fourth, means for automatically distributing rosin over said seam while the sheets are advancing and for the purpose of soldering it in the ordinary manner by hand; fifth, in the proper location of a furnace containing a plurality of soldering-irons for the purpose of soldering said seam while the sheets are momentarily at rest; sixth, painting-rolls which serve to coat one side only with paint while the sheets are being drawn through the same; seventh, means for attaching the advancing end of the joined sheets to the disks of a reel for the purpose of winding said joined sheets into a roll; eighth, means for preventing the painted side of the sheet from smearing its unpainted side while the same are being wound into a roll on the reel; ninth, constructing the bearings for the reel in such manner that the reel may be easily removed from the same when it contains the full roll of the terne plates; tenth, means for drawing backward the joined sheet, so as to gage the rear end of the same against the gaging-bar, and, finally, combining said means and mechanism in a simple and compact manner, so that they can be conveniently operated and will not be liable to get out of order.

Figure 2:
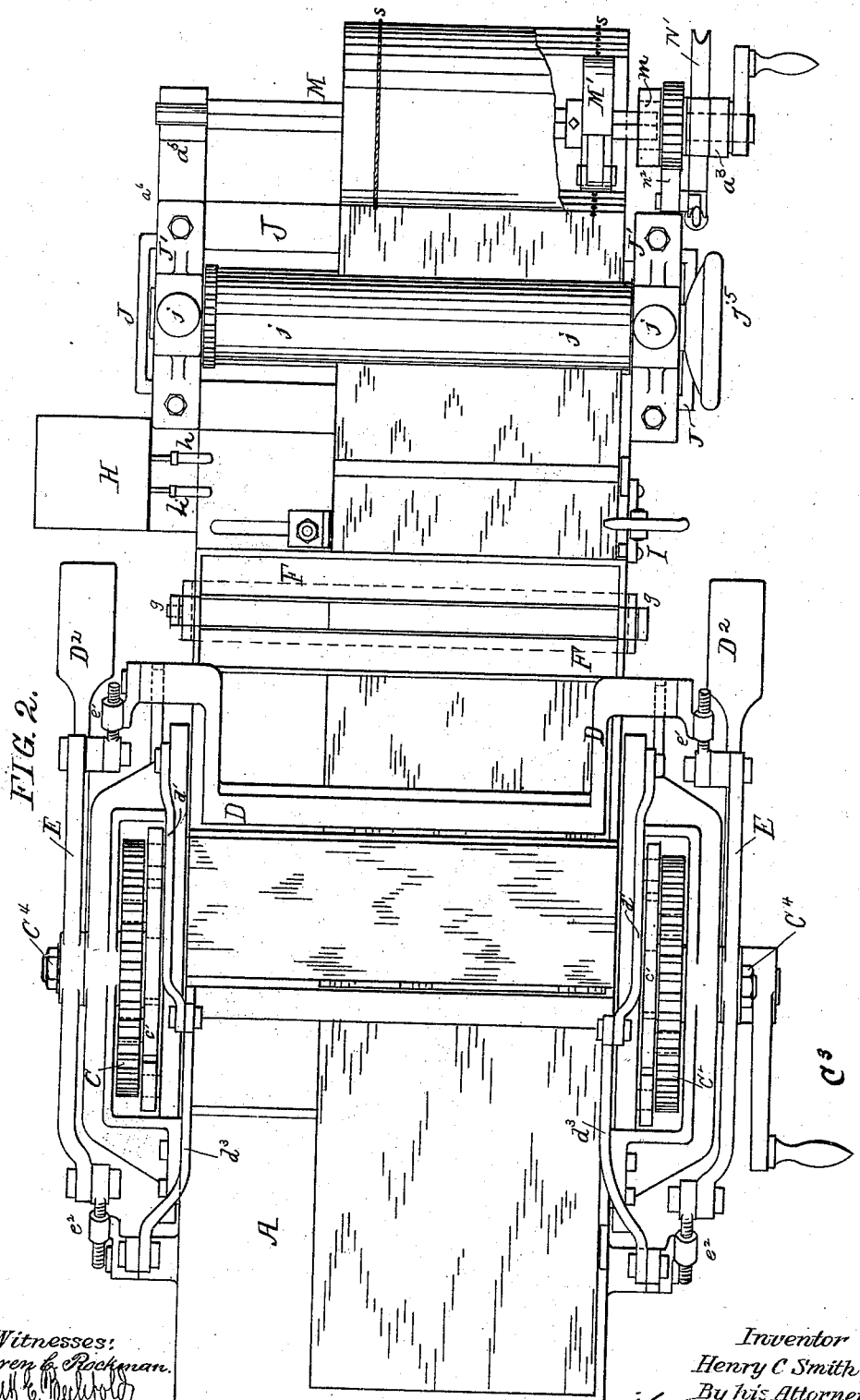
Figure 3:
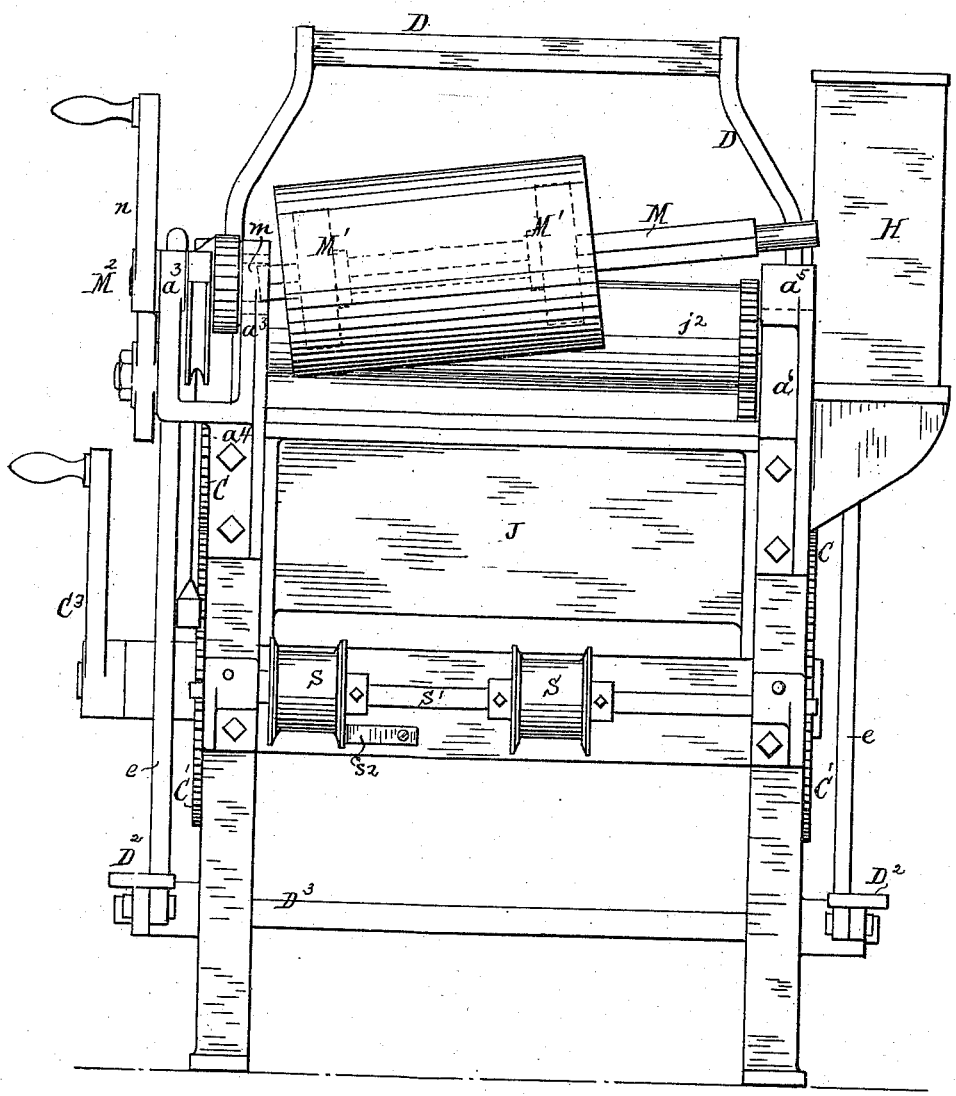

Referring to the accompanying drawings, Figure 1 is a longitudinal sectional view of my improved machine for preparing roofing-plates. Fig. 2 is a plan view. Fig. 3 is an end view looking in the direction of the arrow, Fig. 1, showing the roll of roofing-tin partly elevated on one side. Figs. 4, 5, 6, 7, 8, 9, 10, 11, 12, and 13 are detail views illustrating parts of the lapping mechanism. Figs. 14 to 21, inclusive, are diagram views illustrating the method of lapping the edges of the plates. Fig. 22 is a detailed sectional view on the line 22 22, Fig. 1, illustrating the operation of the valve for controlling the flow of rosin onto the plates. Fig. 23 is a sectional view on the line 23 23, Fig. 1, illustrating the nippers. Figs. 24 to 28, inclusive, are diagrams illustrating modifications of my invention.

The table A, on which the sheets of tin are placed, is supported by suitable legs $a\ a$ and has a portion of its under surface beveled to a point $a'$, being inclined on the under side. Beyond this point is a stationary cross-plate A', under which the tin passes, and this plate is beveled on the upper side to a point $a^2$. In the space between the two points $a'\ a^2$ is formed the interlocking joint between the two sheets of tin.

Under the table A is a clamping-plate B, and above the plate A' is the clamping-plate B'. These jaws are shaped as clearly shown in Fig. 1 and are adapted to slide in ways in a rocking frame $B^2$. (Illustrated in detail in Figs. 8 and 9.) This frame has grooves $b\ b$, in which the ends $b'$ of the clamping-plates B B' slide.

The clamping-plates B B' are connected to the wheels C C through links $c'$, (shown in detail in Figs. 6 and 7,) the links in the present instance having pins $c$ at one end adapted to the wheels C C and pins $c^2$ adapted to openings $b^2$ in the ends of the clamping-plates B B', as shown in Fig. 12.

When the wheel C is turned in the direction of its arrow, Fig. 1, it first draws the two clamping-plates B B' together onto the lapped tinned sheets, as shown in Fig. 16, and then turns the rocking frame $B^2$ and the clamping-plates with it, as shown in Figs. 17 and 18, interlocking the plates, as described hereinafter.

The wheel C in the present instance is a gear-wheel meshing with the gear-wheel C', mounted on a shaft $C^2$, provided with a handle $C^3$ in the present instance.

$d\ d$ are gaging-bars, one mounted above the table A and one mounted below the plate A'. These bars are pivoted to the rocking frame $B^2$ by links $d'$, and also connected to the short arm $d^2$ of each hammer D D' by an extension $d^3$. One hammer is mounted above the table and the other below the plate A' of the table, so that when motion is imparted to the hammers they will strike the interlocked joint on both sides of the same.

The gaging-bars $d\ d$ are for the purpose of gaging the lap of the two sheets of tin, as shown in Fig. 14, so as to insure the proper joint of the sheets when bent. These gaging-bars are so coupled to the rocking frame $B^2$ that when it is turned they will be raised so as to allow the clamping-plates B B' to clamp the two sheets of tin at the point where they overlap each other. The movement of the rocking frame $B^2$ is continued and the clamping-plates B B', carrying the lapped joint of the sheets of tin, are brought into the position shown in Fig. 18. On the reversal of the movement of the shaft by the operator the plates will be retracted, as shown in Fig. 19, and returned to their normal position, together with the gaging-bars $d\ d$. This will leave the lapped and bent portions of the sheets of tin free to be acted upon by the hammers D D', as shown in Fig. 20, making the joint shown in Fig. 21.

The turning or lapping of the ends of the sheets of tin is clearly illustrated by the diagrams Figs. 14 to 21, inclusive.

The hammers D D' are operated by treadles $D^2$, pivoted to a cross-shaft $D^3$. I have shown in the present instance two treadles, so that the hammers can be operated from either side of the machine.

Hung on the stud $C^4$, carrying the wheel C, is a two-armed lever E. One arm of this lever is connected to the treadle by a rod $e$ and to the hammer D by an adjustable link $e'$. The opposite arm of the lever is connected to the hammer D' by an adjustable link $e^2$, so that when either of the treadles $D^2$ is depressed the hammers D D' are brought together and their faces press upon the formed seam and close it. The end of the two-armed lever E which is nearest to the hammer D' is weighted heavier than the other end, so that the hammers will be returned to their normal position as soon as the pressure is removed from the treadles $D^2$. To further assist the hammers to return to their normal position and also to raise the treadles $D^2$, I provide springs $e^3$, which are hung from brackets $e^4$ and connected to each treadle.

After the sheets of tin have been interlocked in the manner described the strip passes to a point directly under the rosin-hopper F, where rosin is applied to the seam. In the bottom of the hopper is a slotted valve $f$, adapted to move forward and to carry with it the rosin contained in its slot $f'$, the bottom plate $f^2$ of the hopper preventing the escape of rosin until the valve is moved forward. The valve is hung to two arms F' on each side of the machine, as shown in Fig. 22, the arms being pivoted at $g$ to the frame of the machine. The turned-down portion $f^3$ of the valve $f$ has pins adapted to slots in the arms F'. A trip-pawl $F^2$, pivoted at $g'$ to the frame of the machine, has it end $f^4$ so adjusted that it will rest in the path of the plate of tin and will be acted upon by the seam, as clearly indicated in Fig. 1. As the plate of tin is moved forward, the pawl will be carried in the same direction, and in consequence the arms F' will swing, being pivoted to the pawl $F^2$, and will carry with them the valve $f$, which will deposit a suitable quantity of rosin upon the joint. When the pawl $F^2$ reaches a certain point, it frees itself from the joint and its spring $g^3$ returns it to its normal position, at the same time returning the valve $f$ and closing the bottom of the hopper F. The rosin-seam is then moved to a point beyond the hopper for soldering, which in the present instance is done by hand, H being the soldering-iron furnace and $h\ h$ the soldering-irons, which are of the ordinary construction.

I is a pair of pliers. (Shown in detail in Fig. 23.) One arm, $i$, of the pliers is adapted to a slideway $i^2$ on the frame of the machine and the other arm, $i'$, is provided with a suitable handle, by which the pliers are manipulated. The object of providing a pair of pliers at this point is to provide means for forcing the plate back against the gage-bar $d$ of the seam-forming mechanism, so as to insure the proper lap of the two plates of tin to be joined.

J is the reservoir for the paint to be applied to one side of the sheets of tin. Within this reservoir is a roller $j$, mounted in suitable bearings in housings J', secured in the present instance to the reservoir. Mounted above the roller $j$ is a felt-covered roller $j'$, which receives the paint from the reservoir through the medium of the roller $j$, and above the roller $j'$ is a pressure-roller $j^2$, between which and the roller $j'$ is passed the strip of tin, the roller $j'$ coating the tin on the under side with paint from the reservoir. The pressure is regulated by a set-screw $j^3$, and between the set-screw and the bearings of the rolls $j^2$ are springs $j^4$, which allow the roller $j^2$ to yield when necessary. The paint-rolls are revolved automatically as the tin is drawn through the machine; but they can be manipulated by the hand-wheel $j^5$, (shown in Fig. 2,) for the purpose of adjusting the rolls or starting the sheet in its passage through the machine.

M is a shaft having disks M' secured thereto. The shaft in the present instance is a squared shaft and the disks are adjustable thereon, so that they can be moved toward and from each other to accommodate different widths of tin plates, and upon these disks is wound the sheet of tin as it is received from the paint-rolls. In the present instance the shaft M is detachable, being adapted to an open bearing $a^5$ on a bracket $a^6$, projecting from the frame of the machine, and to a squared socket $m$ of a short shaft $M^2$, mounted in bearings $a^3$ on a bracket $a^4$, projecting from the frame of the machine.

The object of making the shaft M detachable from the driving-shaft $M^2$ is to provide means for the ready removal of the roll of tin collected on the shaft, which can be detached from the disks, and is ready then for shipment without re-rolling.

Each disk M' is cut away at $m'$, forming an undercut lip $m^2$, and a spring-pawl $m^3$ is so pivoted to the disk M' at the cut-out portion that its end impinges against the undercut lip $m^2$. When the tin is to be coiled, the end of the same which has been bent before the rest of the tin has been run through the machine is hooked over this pawl $m^3$, and the strain caused by the coiling of the tin serves to tighten the pawl against the undercut lip and to securely hold the end of the tin therein.

In order to prevent the painted side of the tin smearing the unpainted side, I separate the coils of tin by cords or bands $s$, of suitable material, preferably coarse twine, which is coiled around suitable rolls or spools S adjustable on a shaft S', mounted in brackets $s'$, projecting from the frame of the machine. These spools are so set in respect to the roll of tin that the twine will be coiled between the layers of tin, thus separating them.

$s^2$ is a friction-spring to prevent the spools from unwinding faster than the tin is wound upon the shaft.

The handle $n$ on the shaft $M^2$ is turned in the direction of the arrow, Fig. 1, to coil the tin, and the coil is held in position by a weight N, suspended from a cord $n'$, attached to a pawl $n^2$, engaging with a ratchet-wheel $p$ on the shaft $M^2$. The pawl is pivoted to a weighted segment N', loosely suspended from the shaft $M^2$. The segment is grooved to receive the cord $n'$. It will be noticed when the shaft is turned in the direction of the arrow, Fig. 1, to roll up the tin the ratchet-wheel slips past the pawl; but when the sheet of tin is drawn back by the pliers so that its end will rest against the gage $d$ the segment N' and weight N will be raised, the pawl engaging with the ratchet-wheel and locking the segment N' to the shaft, so that a certain amount of tension is always kept upon the roll of tin; yet the tin can be drawn back when required.

The operation of the machine is as follows: A sheet of tin is laid upon the table A and its forward edge is adjusted against the lower gage-bar $d$. The machine is then operated in order to bend this forward end of the sheet so that it can be hooked into the disks of the coiling-reel. The sheet is then passed through the machine until its rear edge rests against the upper gage-bar $d$, when another sheet of tin is placed within the machine until its forward edge rests against the lower gage-bar, as shown in Fig. 14, the two sheets of tin overlapping, as shown in Fig. 15. The interlocking mechanism is then set in motion, the clamping-plates holding the two sheets of tin at the joint, as shown in Fig. 16, and when they are turned as shown in Fig. 17 they make the interlocking joint, as shown in Fig. 18, after which the clamping-plates are retracted, as shown in Fig. 19, and the hammers D D' close the joint, as shown in Fig. 20. When this seam is made, the tin is fed forward and the rosin applied. In the meantime another plate of tin has been inserted in the machine and its joint with the last sheet made. The tin is then moved to a position where the joints can be readily soldered, after which it is passed through the painting-rolls and receives a coat of paint on one side only, and is finally coiled on the shaft N, a spacing-strip, of cord or other suitable material, being placed between each coil.

Having thus described my invention, I claim and desire to secure by Letters Patent—

1. The combination in a machine for preparing roofing tin, of the table for holding the sheets of tin, gages for determining the lap of the ends of the same, clamping plates for bending the lapped portions of the sheets of tin to form the interlocking joint, hammers for flattening said joint, and mechanism for operating said gages, clamping plates and hammers, substantially as described.

2. The combination in a machine for preparing roofing tin, of the table for holding the sheets of tin, gages for determining the lap of the ends of the same, clamping plates for bending the lapped portions of the sheets to form the interlocking joint, hammers for flattening said joint, and mechanism for operating said gages, clamping plates and hammers successively in the order named, substantially as described.

3. The combination in a machine for preparing roofing tin, of the table adapted to hold sheets of tin, mechanism for joining the ends of said sheets, a rosin hopper, a valve therefor for discharging a certain amount of rosin on the joint, mechanism for painting one side of the sheets of tin, and mechanism for coiling the same, substantially as described.

4. The combination in a machine for preparing roofing tin, of the table, the clamping plates, gages and hammers for forming the interlocking joint, mechanism substantially as described for operating said plates, gages and hammers to form said joint, a rosin hopper beyond the said mechanism, mechanism for painting one side of the sheet, and mechanism for coiling the tin after it has been painted, substantially as described.

5. The combination of mechanism for forming an interlocking joint, the rosin hopper, a valve therefor, tripping mechanism for said valve, sliding pinchers adapted to engage a sheet of tin and adjust it, painting mechanism and mechanism for coiling the tin after it has been painted, substantially as described.

6. The combination of the mechanism for forming an interlocking joint between two sheets of tin, a rosin hopper, a valve therefor, tripping mechanism for said valve acted upon by the joint of the tin, paint carrying rolls for painting one side of the tin, mechanism for coiling the tin, and separating strips adapted to be placed between the coils of the same, substantially as described.

7. The combination of the table, the pivoted gage bars $d\ d$, the clamping plates B B', the hammers D D', a swinging carrier for the clamps and hammers, with mechanism for operating the clamps and hammers for making an interlocking joint, substantially as described.

8. The combination of the gage bars $d\ d$, swinging guides $B^2$ connected to the same, clamping plates B B' having bosses at the sides of the same adapted to slide in the guides $B^2$, a wheel C, links connecting the clamping plates to the wheel so that on its rotation it will draw the clamping plates together, pivoted hammers D D', and mechanism for operating said hammers, substantially as described.

9. The combination of the clamping plates B B', the gage bars $d\ d$, the pivoted hammers D D', a rocking lever connected to each hammer, and a treadle for operating said rocking levers, substantially as described.

10. The combination of the mechanism for making the interlocking joint, the hopper F having a sliding valve $f$, rocking arms F' connected to the valve, pawls $F^2$ connected to the arms and having ends $f^4$ which extend into the path of the sheet of tin so that they will be caught by the seam and moved forward to open the valve and allow a certain quantity of rosin to be deposited upon the plate, substantially as described.

11. The combination of the mechanism for making the interlocking joint, the rosin depositing mechanism, paint distributing rollers for painting one side of the tin, a shaft M, and a pair of disks thereon forming a reel for coiling the tin upon, said disks being provided with devices for holding the end of the tin, substantially as described.

12. The combination of the seaming and painting mechanism with a shaft M having adjustable disks thereon forming a reel upon which the tin may be coiled, bearings for said shaft, one of said bearings consisting of a short shaft $M^2$ having a pocket for the reception of one end of the shaft M, and clamps on said disks for holding the end of the tin, substantially as described.

13. The combination of the interlocking seam forming mechanism, the rosin depositing mechanism and the painting mechanism, with a coiling device, a short shaft $M^2$ having a ratchet wheel, a segment N' carrying a pawl engaging with said ratchet wheel, and a weight N for said pawl, the whole arranged substantially as described.

14. The combination of the seaming mechanism, the rosin depositing mechanism, the painting rolls, the coiling mechanism, a shaft S', and spools mounted on said shaft and carrying cords or bands adapted to pass in between each coil of tin separating the painted from the unpainted side of the same, substantially as described.

In testimony whereof I have signed my name to this specification in the presence of two subscribing witnesses.

HENRY C. SMITH.

Witnesses:
FREDK. ANNUSPAUGH,
J. R. COLLINGWOOD.